US012117092B2

(12) United States Patent
Weigand et al.

(10) Patent No.: US 12,117,092 B2
(45) Date of Patent: Oct. 15, 2024

(54) ELECTROPNEUMATIC SOLENOID VALVE, FIELD DEVICE HAVING SOLENOID VALVE AND DIAGNOSTIC METHOD FOR ELECTROPNEUMATIC SOLENOID VALVE

(71) Applicant: SAMSON AKTIENGESELLSCHAFT, Frankfurt (DE)

(72) Inventors: Christof Weigand, Oberursel (DE); Stefan Kolbenschlag, Darmstadt (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 559 days.

(21) Appl. No.: 17/415,591

(22) PCT Filed: Dec. 17, 2019

(86) PCT No.: PCT/EP2019/085676
§ 371 (c)(1),
(2) Date: Jun. 17, 2021

(87) PCT Pub. No.: WO2020/127282
PCT Pub. Date: Jun. 25, 2020

(65) Prior Publication Data
US 2022/0065362 A1 Mar. 3, 2022

(30) Foreign Application Priority Data

Dec. 17, 2018 (DE) ...................... 10 2018 132 442.1

(51) Int. Cl.
F16K 31/06 (2006.01)
F16K 1/44 (2006.01)
F16K 37/00 (2006.01)
H01F 7/08 (2006.01)
H01F 7/16 (2006.01)

(52) U.S. Cl.
CPC ............ F16K 31/0624 (2013.01); F16K 1/44 (2013.01); F16K 31/0627 (2013.01); F16K 31/0634 (2013.01); F16K 37/0083 (2013.01); H01F 7/081 (2013.01); H01F 7/16 (2013.01)

(58) Field of Classification Search
CPC .... F16K 31/0624; F16K 1/44; F16K 31/0627; F16K 31/0634; F16K 37/0083; H01F 7/081; H01F 7/16
See application file for complete search history.

(56) References Cited

U.S. PATENT DOCUMENTS

| 3,203,441 | A | | 8/1965 | Kervin | |
|---|---|---|---|---|---|
| 5,046,530 | A | * | 9/1991 | Gossner | F16K 31/0693 251/282 |
| 5,476,313 | A | | 12/1995 | Lauer | |
| 5,535,783 | A | | 7/1996 | Asou et al. | |
| 8,794,718 | B2 | * | 8/2014 | Bensch | B60T 15/041 137/596.1 |
| 10,746,318 | B2 | * | 8/2020 | Kolbenschlag | F15B 13/044 |
| 11,802,634 | B2 | * | 10/2023 | Hartmann | F16K 37/0083 |
| 2003/0140907 | A1 | * | 7/2003 | Gagnon | F02M 26/53 123/568.26 |
| 2010/0051842 | A1 | * | 3/2010 | Mertens | F16K 31/0624 251/129.08 |
| 2016/0291075 | A1 | | 10/2016 | Sommansson | |
| 2017/0122631 | A1 | * | 5/2017 | Birkelund | F25B 41/33 |
| 2017/0234920 | A1 | * | 8/2017 | Nair | H01F 7/064 324/423 |
| 2018/0274692 | A1 | * | 9/2018 | Kolbenschlag | F16K 31/0675 |
| 2018/0292019 | A1 | * | 10/2018 | Beuschel | F16K 31/0627 |

FOREIGN PATENT DOCUMENTS

| DE | 1179068 | B | | 10/1964 | |
|---|---|---|---|---|---|
| DE | 2903296 | A1 | | 7/1980 | |
| DE | 3942532 | A1 | * | 12/1990 | |
| DE | 4204417 | A1 | | 8/1993 | |
| DE | 19711262 | A1 | * | 9/1998 | ......... F16K 31/0624 |
| DE | 19711289 | A1 | | 9/1998 | |

(Continued)

OTHER PUBLICATIONS

Notification of Transmittal of the International Search Report and the Written Opinion of the International Searching Authority, of the Declaration dated Jun. 23, 2020, Application No. PCT/EP2019/085676.

(Continued)

Primary Examiner — Octavia Hollington
(74) Attorney, Agent, or Firm — Banner & Witcoff Ltd.

(57) ABSTRACT

Electropneumatic solenoid valve includes an electromagnetic actuator with an energizable coil and a solenoid armature movable relative to the coil, an air chamber with three air channels, and a valve member. The three air channels include first and second air channels and a control air channel. The valve member, in a first closed position, closes the first air channel and releases the second air channel and which, in a second closed position, closes the second air channel and releases the first air channel. The valve further includes a driver movable in a first and second actuating directions and that connects the valve member to the solenoid armature, a driver-pretensioning spring arranged between the driver and the solenoid armature, to provide a pretensioning force to the driver, and a restoring spring between the driver and the electromagnetic actuator to provide a restoring force to the driver against the driving direction.

18 Claims, 7 Drawing Sheets

(56) References Cited

FOREIGN PATENT DOCUMENTS

Figure 3A:
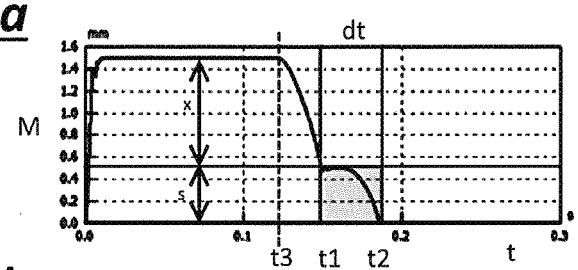

| | | | |
|---|---|---|---|
| DE | 19933329 C1 * | 6/2000 | ............. F16K 1/443 |
| DE | 102016120655 A1 | 5/2018 | |
| EP | 1001199 A2 | 5/2000 | |
| EP | 2459860 * | 9/2016 | |
| JP | S5534093 U | 3/1980 | |
| JP | S6118292 Y2 * | 6/1986 | |

OTHER PUBLICATIONS

German Action dated Nov. 18, 2019, Application No. 10 2018 132 442.1.

* cited by examiner

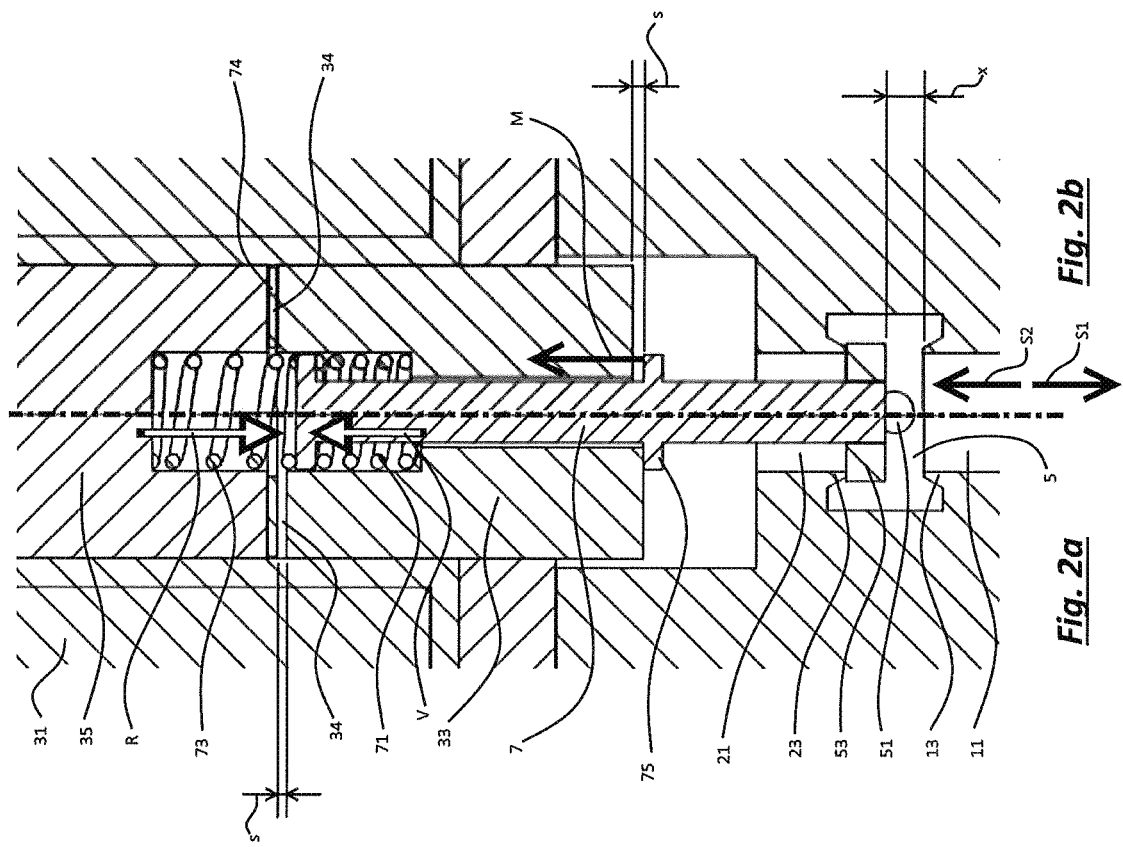
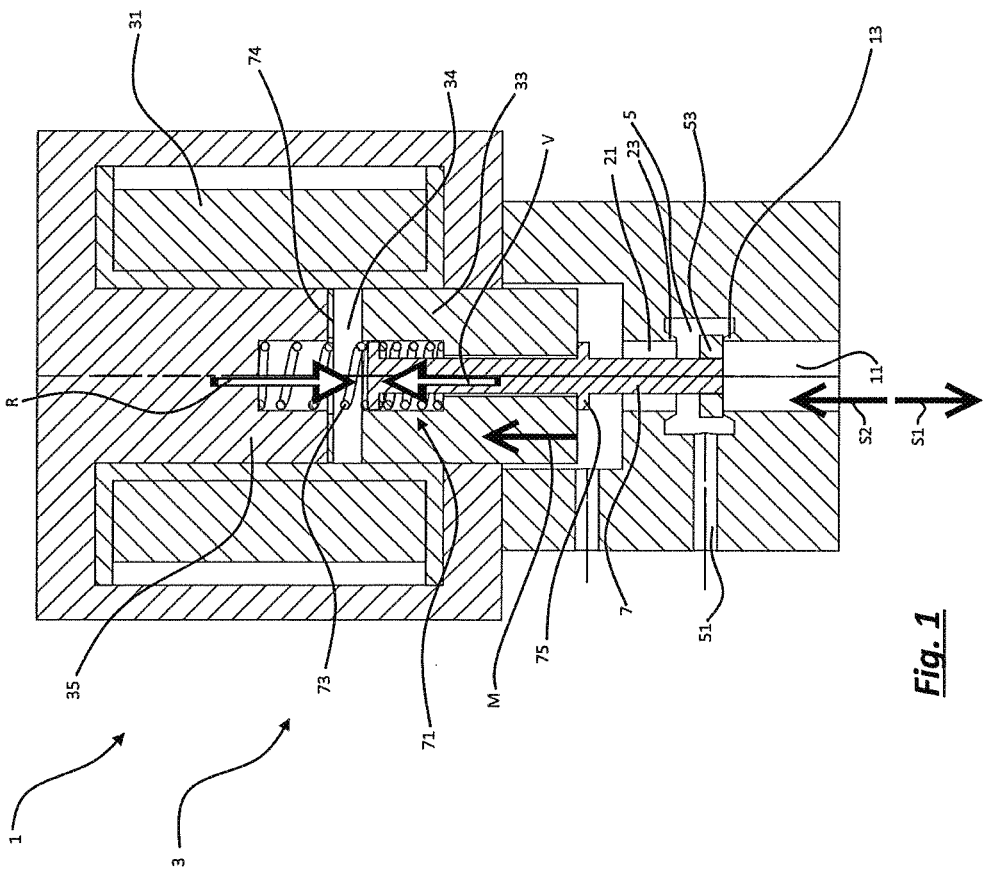

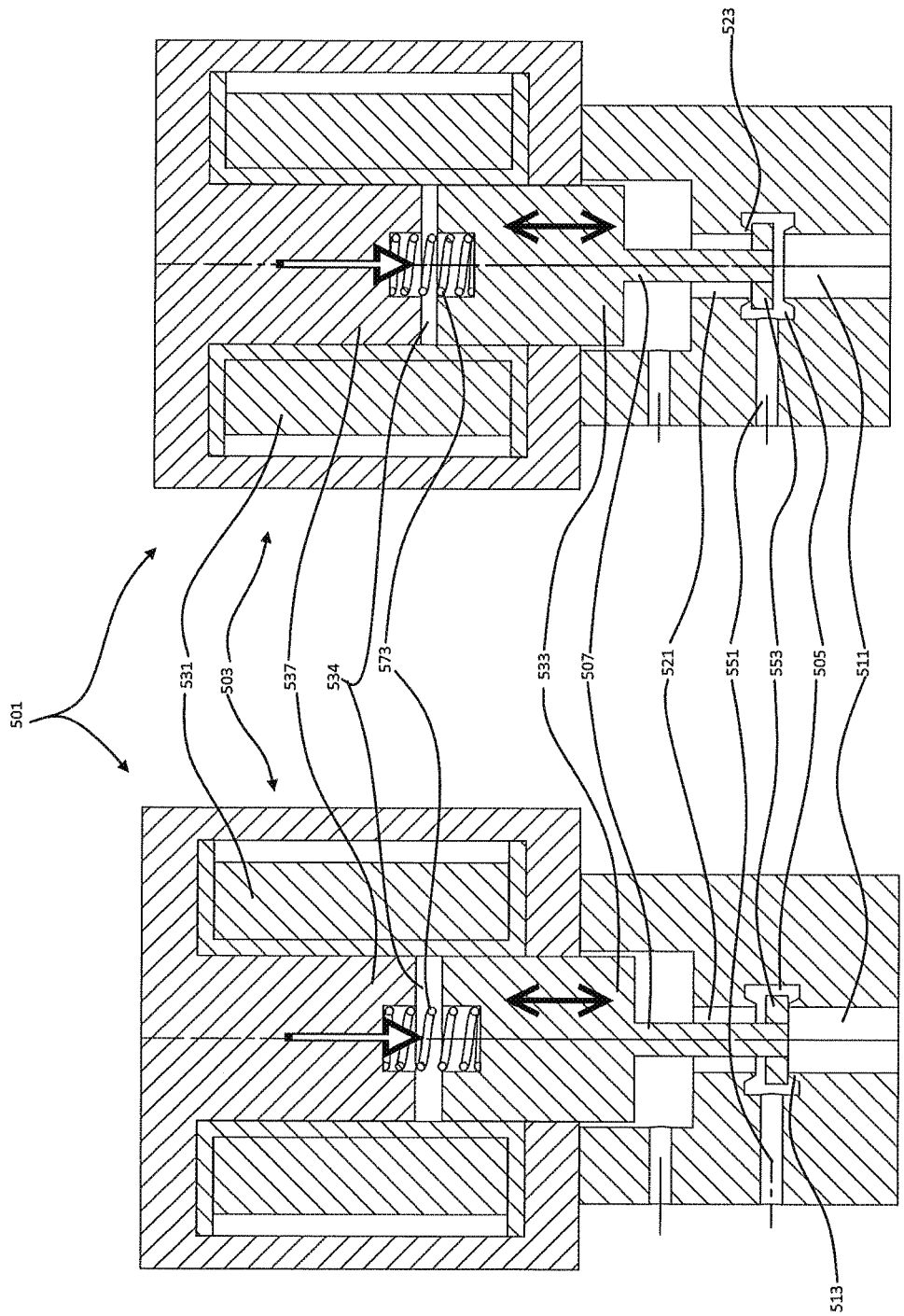

ELECTROPNEUMATIC SOLENOID VALVE, FIELD DEVICE HAVING SOLENOID VALVE AND DIAGNOSTIC METHOD FOR ELECTROPNEUMATIC SOLENOID VALVE

CROSS REFERENCE TO RELATED APPLICATIONS

This patent application is a U.S. National Stage Application of International Application No. PCT/EP2019/085676, filed Dec. 17, 2019, which claims priority to German Patent Application No. 10 2018 132 442.1, filed Dec. 17, 2018, each of which is incorporated herein by reference in its entirety.

BACKGROUND

Field

It is an object of the disclosure to provide an electropneumatic solenoid valve for a field device of a process plant, such as a power plant, for example a nuclear power plant, a chemical plant, for example a petrochemical plant, such as a refinery, a food processing plant, such as a brewery or a dairy, or the like. The disclosure also relates to a field device having a single-acting or double-acting pneumatic actuator comprising an electropneumatic solenoid valve. The disclosure further relates to a diagnostic method for an electropneumatic solenoid valve.

Related Art

Electropneumatic solenoid valves are known from the prior art, which comprise an electropneumatic actuator and a 3/2-way valve actuated thereby. Such a 3/2 directional control valve (501) is illustrated in FIGS. 9 and 10. When used in an electropneumatic field device, the 3/2 directional control valve (501) may include a supply air channel (511) connected to a pneumatic source, an exhaust air channel (521) connected to a compressed air sink, such as atmosphere, and a control air channel (551) for pressurizing and exhausting a pneumatic actuator. The 3/2-way valve (501) further comprises an air chamber (505) into which the air channels (511, 521, 551) open, and a valve member (553) movable within the air chamber (505). The valve member (553) can close either the supply air channel (511) or the exhaust air channel (521).

For actuating the valve member (553), i.e. for moving the valve member between an exhaust air channel closed position (FIG. 10) and a supply air channel closed position (FIG. 9), the valve member is rigidly connected by an actuating rod (507) to a solenoid armature (533) of an electromagnetic linear actuator (503). The electromagnetic linear actuator is provided with a restoring spring (573) between the solenoid armature (533) and the ferromagnetic core (537) of the actuator. The restoring spring is provided to move the solenoid armature (533), for example, to the supply air channel closing position (FIG. 9) when the electromagnetic actuator is inactive by de-energizing the coil (531). When the electromagnetic actuator is activated, the solenoid armature is magnetically attracted against the force of the restoring spring (573) and, if the voltage is sufficiently strong, moves in such a way that the valve member is brought into the exhaust air channel closing position (FIG. 10).

A non-magnetic gap space (534) is provided between the solenoid armature and the magnetizable core to prevent the solenoid armature (533) from coming into contact with the magnetizable core (537). In the event of contact, extremely high adhesive forces would occur. The gap space is sized to tolerate some degree of wear and/or settlement on the valve member (553) and cooperating valve seat (523) of the exhaust channel (521) without causing contact between the solenoid armature and core and the consequent functional failure of the electropneumatic solenoid valve. The magnetic attraction force between the solenoid armature and the core increases quadratically depending on the reciprocal value of the distance between the core and the solenoid armature. Therefore, wear acts as a self-reinforcing effect. After an initial slight wear, failure of the electropneumatic solenoid valve can occur quickly and in an uncontrolled manner. In order to avoid a functional failure during operation of a plant, the 3/2-way valve is replaced preventively. Since the actual state of wear can only be seen when the valve is removed and disassembled, unnecessary replacement costs must be accepted in favor of safe plant operation.

DE 10 2016 120 655 A1 discloses a method for monitoring the condition of a solenoid valve, in which a voltage induced by resetting a plunger within an electromagnet is detected by a measuring unit as a function of time after the coil current is switched off and is compared with a reference function by an evaluation unit. Conclusions about the state of the springs should be able to be drawn from the comparison. However, the method described in DE 10 2016 120 655 A1 does not allow any conclusions to be drawn about wear and/or settlement phenomena on the valve member.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a sectional view of an electropneumatic solenoid valve, according to an exemplary embodiment of the disclosure, in the first closed position.

FIG. 2a a partial section of the solenoid valve according to FIG. 1 in the second closed position.

FIG. 2b the solenoid valve according to FIG. 1 in the second closed position, with the solenoid armature having reached its end position.

FIG. 3a a path-time diagram showing the position of the solenoid armature starting from the first closed position in the driving direction according to an exemplary embodiment of the disclosure.

Figure 3B:
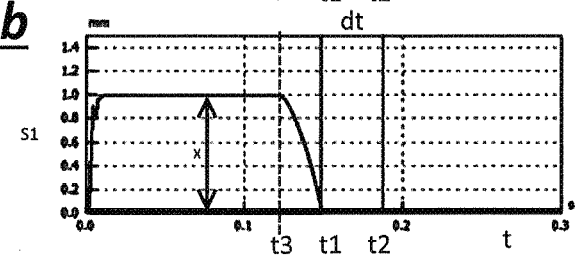

FIG. 3b a travel-time diagram showing the position of the valve member of the solenoid valve of the disclosure according to FIG. 1 starting from the first closed position in the second actuating direction, according to an exemplary embodiment of the disclosure.

Figure 3C:
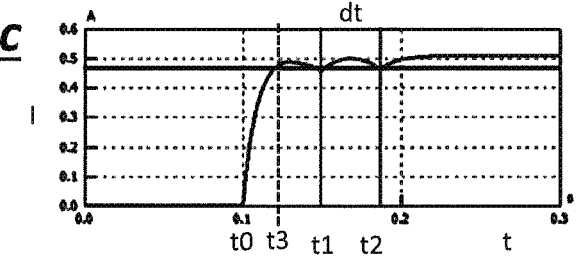

FIG. 3c a current-time diagram showing the current flow through the solenoid coil of the electropneumatic actuator according to FIG. 1 during the movement of the valve member from the first closed position to the second closed position, according to an exemplary embodiment of the disclosure.

Figure 4A:
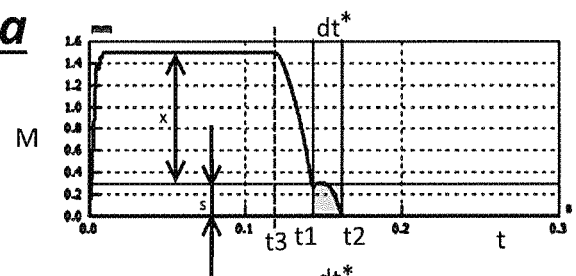

FIG. 4a a displacement-time diagram of the solenoid armature position for a defective electropneumatic actuator, according to an exemplary embodiment of the disclosure.

Figure 4B:
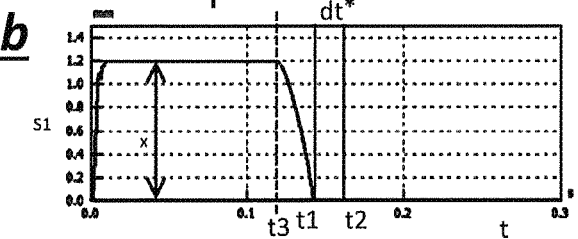

FIG. 4b a travel-time diagram of the valve member position for a defective electropneumatic actuator, according to an exemplary embodiment of the disclosure.

Figure 4C:
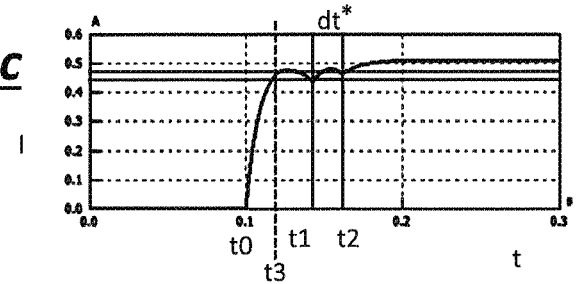

FIG. 4c a current-time diagram for a defective electropneumatic actuator according to FIG. 1.

Figure 5:
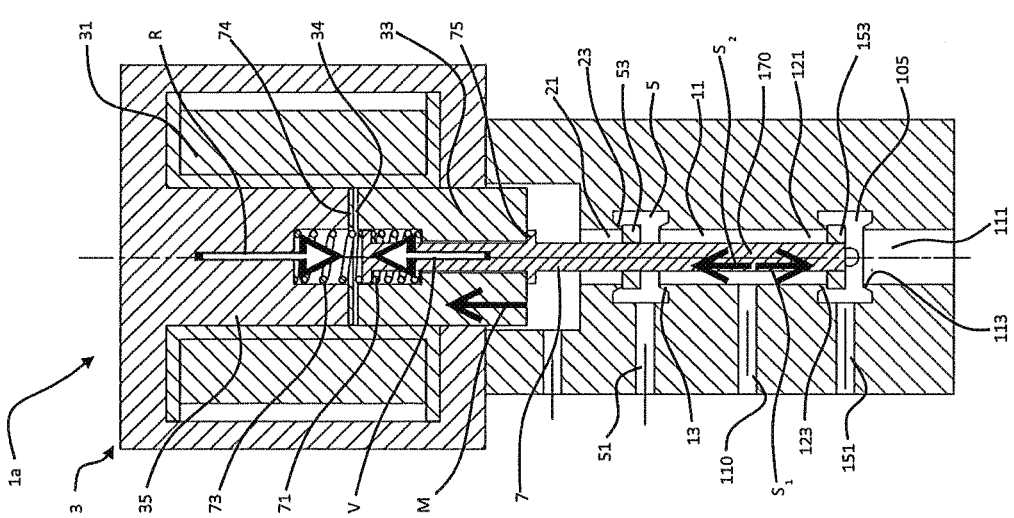

FIG. 5 a sectional view of another electropneumatic solenoid valve, according to an exemplary embodiment of the disclosure, in the second closed position.

Figure 6C:
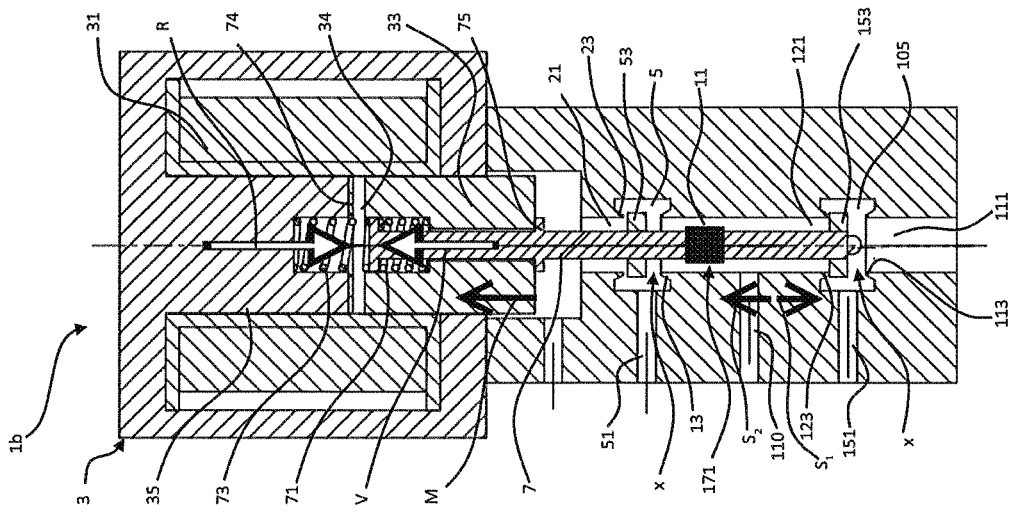
Figure 6B:
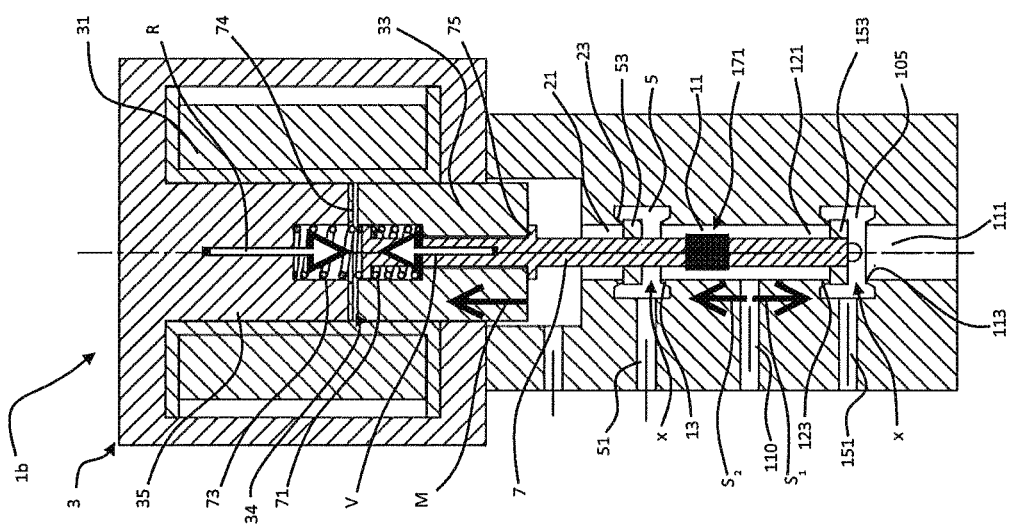
Figure 6D:
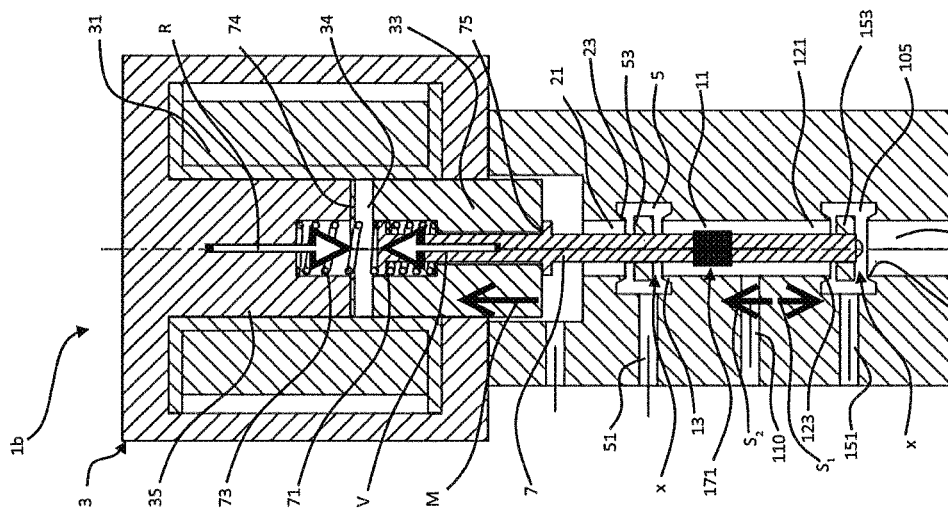
Figure 6A:
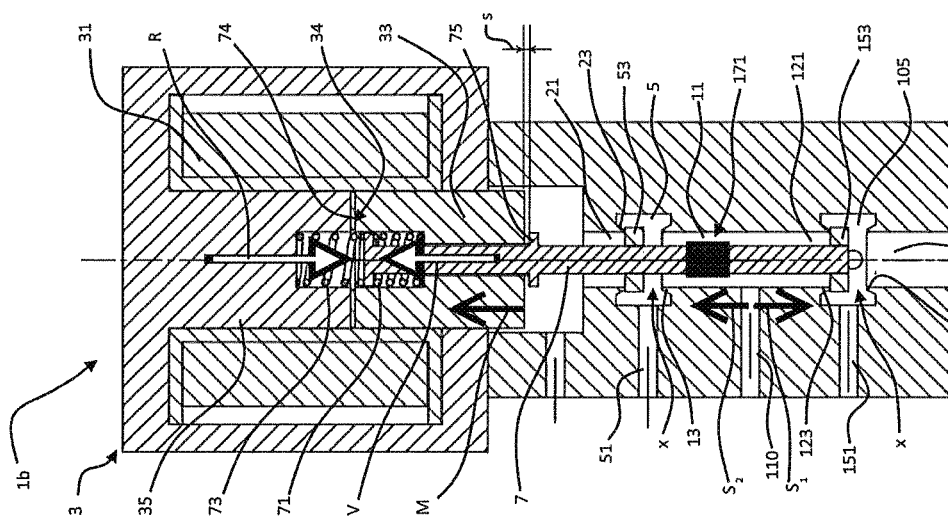

FIG. 6a a sectional view of a further solenoid valve, according to an exemplary embodiment of the disclosure, with several valve members in the second closed position, whereby the solenoid armature has reached its end position.

FIG. 6b the solenoid valve according to FIG. 6a in the second closed position, with the solenoid armature in contact with the stop.

FIG. 6c a sectional view of the solenoid valve according to FIG. 6a in a state in which the first valve member is released from a closed position.

FIG. 6d a sectional view of the solenoid valve according to FIG. 6a in a state in which both valve members are released from a closed position.

Figure 7:
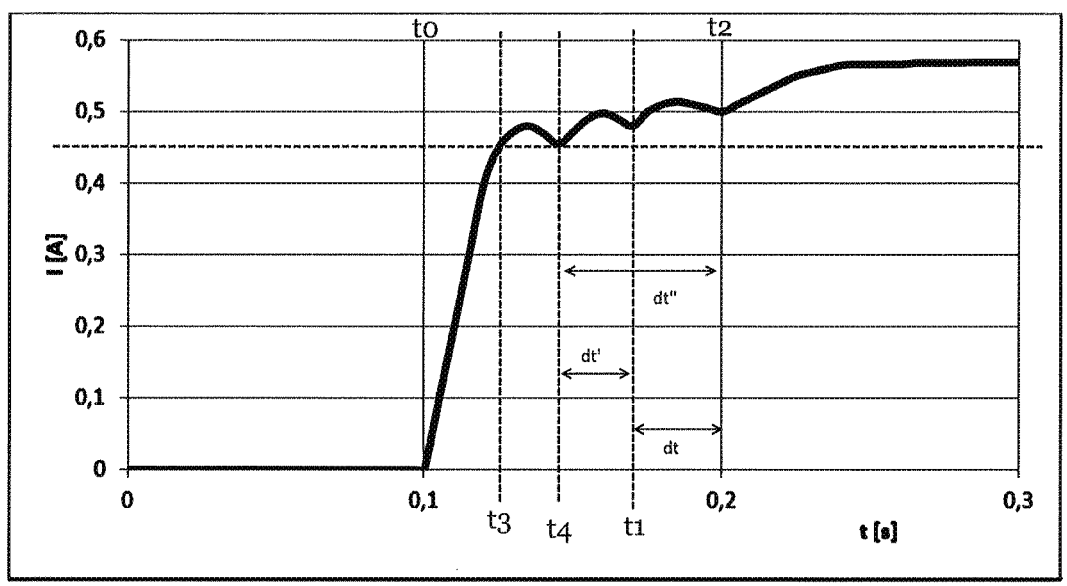

FIG. 7 is a current-time diagram showing the current flow through the solenoid coil of the electropneumatic actuator according to FIGS. 6a to 6d as the valve member moves from the first closed position to the second closed position.

Figure 8:
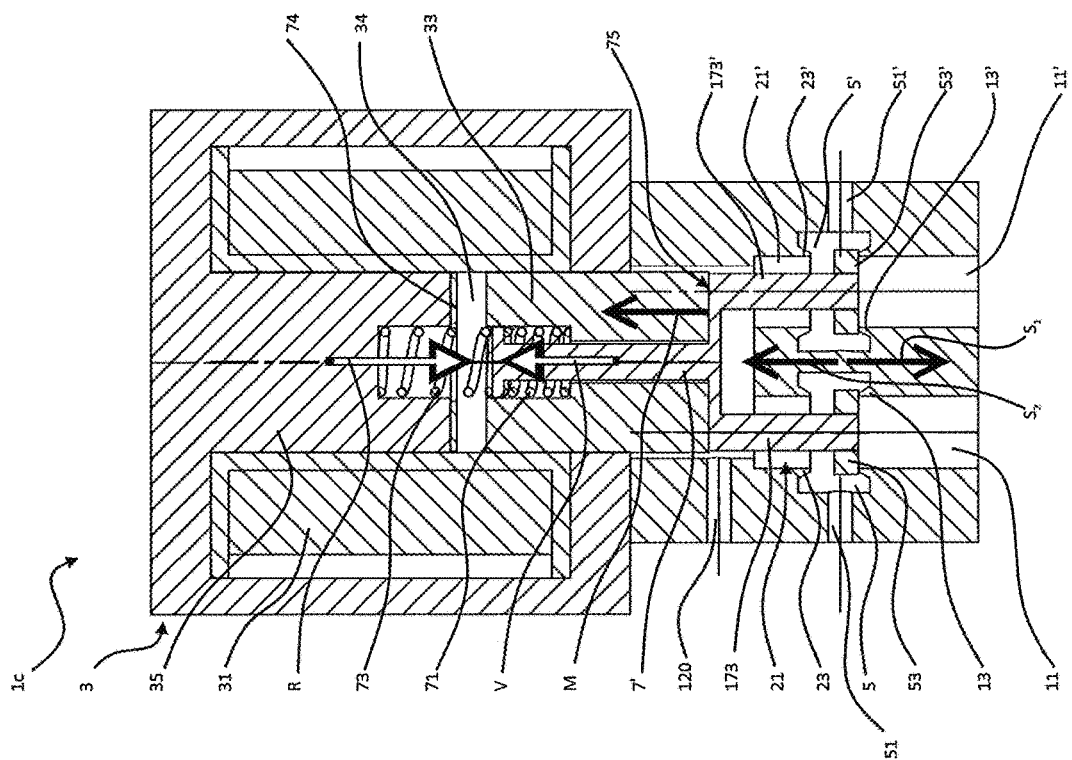

FIG. 8 a sectional view of another control valve, according to an exemplary embodiment of the disclosure, with several valve members.

FIG. 9 a conventional electropneumatic 3/2-way valve in a first closed position.

FIG. 10 the conventional 3/2-way valve according to FIG. 9 in a second closed position.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the disclosure is to overcome the disadvantages of the prior art, include to provide a solenoid valve and a diagnostic method for a solenoid valve with increased reliability.

Accordingly, an electropneumatic solenoid valve is provided for a field device of a process plant, such as a power plant, for example such as a nuclear power plant, a chemical plant, for example a petrochemical plant, a food processing plant, for example a brewery, or the like. The electropneumatic solenoid valve includes an electromagnetic actuator having an energizable coil and a solenoid armature movable relative to the coil. The electromagnetic actuator may further comprise an iron core or magnetic core stationary relative to the coil. In particular, the electromagnetic actuator may be an electromagnetic linear actuator.

The electropneumatic solenoid valve comprises a (first) air chamber into which three air channels open, the three air channels comprising a first air channel, a second air channel and a control air channel. For example, the first air channel may be a supply air channel connected to a pneumatic source, such as a compressed air reservoir, a compressor, or the like. The second channel may be an exhaust channel connected to a pressure sink, such as the atmosphere. The control air channel may be connected to a pneumatic actuator for pressurizing and/or exhausting the actuator. In particular, the electropneumatic solenoid valve is designed as a 3/2-way valve. If the electropneumatic solenoid valve is designed as a 3/2-way valve, a valve member can be accommodated in the air chamber in such a way that the valve member closes either the first air channel or the second air channel. The electropneumatic solenoid valve comprises a valve member which, in a first closed position, closes the first air channel and releases the second air channel; and which, in a second closed position, closes the second air channel and releases the first air channel. In particular, the valve member may be configured such that the control air channel is unobstructed regardless of the position of the valve member. In particular, the electropneumatic solenoid valve is free of further air channels opening into the air chamber. In an exemplary embodiment, only the first air channel, the second air channel and the control air channel open into the air chamber. The first closed position may be designated as the supply air channel closed position. The second closed position may be implemented as an exhaust air channel closed position. The valve member is in particular an at least partially elastic sealing element.

The solenoid valve according to the disclosure comprises a movable driver, in particular an actuating rod or actuating shaft. The driver is movable in a first actuating direction and in a second actuating direction opposite to the first actuating direction. For example, a driver can be designed as an actuating rod and be movable linearly, for example downward and upward. The driver connects the valve member to the solenoid armature in a force-transmitting manner. Between the driver and the solenoid armature, at least one driver pretensioning means, such as a spring, is arranged for providing a pretensioning force to the driver in a driving direction corresponding to the first actuating direction or corresponding to the second actuating direction. Furthermore, at least one restoring pretensioning means, such as a restoring spring, is provided for providing a return force to the driver against the driving direction. The restoring pretensioning means can be arranged in particular between the driver and the electromagnetic actuator, preferably a core of the electromagnetic actuator that is immovable relative to the coil.

The driver is free of a material-locking and/or rigid connection to the solenoid armature. The driver is movable relative to the solenoid armature. In particular, the driver can be linearly movable relative to the solenoid armature. In an exemplary embodiment, the solenoid armature and the driver are movable relative to the coil in the same direction. For example, a driver designed as an actuating rod may have a linear mobility corresponding to the driving direction and the solenoid armature may have a linear mobility corresponding to the actuating directions oriented parallel, in particular coaxial, to each other. If a driver is realized as an actuating shaft, for example, there can be a mutation movement relative to a rotation axis, and the electromagnetic actuator can be realized as a rotation axis with a rotationally movable solenoid armature, which can rotate about the same or another rotation axis.

In an exemplary embodiment, the drive biasing means and the restoring pretensioning means can be formed separately from each other. For example, the driver pretensioning means can be formed as a spring, for example a first spiral spring, and the restoring pretensioning means can be formed as a restoring spring, for example a second spiral spring. It is conceivable that the driver pretensioning means and/or the restoring pretensioning means is formed as a plastic spring. For example, a plastic spring can be implemented as an elastomer block. It is conceivable that such a plastic spring acts in the functional union as a driver pretensioning means on the one hand and a restoring pretensioning means on the other hand. For example, in that the plastic spring is connected to the driver and is supported on the one hand on the solenoid armature and on the other hand on a part of the electromagnetic actuator that is stationary relative to the coil. Such a plastic spring may have different sections, one section acting as a driver pretensioning means and another section acting as a restoring pretensioning means. It is conceivable that the restoring pretensioning means is arranged between the driver and the solenoid armature.

According to an exemplary embodiment, the driving direction corresponds to the second actuating direction, i.e., the first actuating direction corresponds to the direction of movement of the solenoid armature from the second closed position towards the first closed position. The second actuating direction corresponds to the direction of movement of the solenoid armature from the first closed position towards the second closed position. In this exemplary embodiment, the driver pretensioning means provides the pretensioning force in the direction of the second actuating direction, i.e. in the second closed position, as a driving force from the valve member to a seat of the second air channel.

By decoupling the valve member from the solenoid armature by means of the driver and the driver pretensioning means, a limitation of the closing force of the valve member on the valve seat of the air channel in the driving direction is effected. This advantageously limits the closing force on the valve member to a valve seat even if the movable solenoid armature approaches a core of the electric actuator very strongly, for example to a very small gap. In this way, exponentially self-reinforcing wear phenomena can be avoided. Compared with conventional 3/2-way valves, the reliability of the electropneumatic solenoid valve according to the disclosure can be considerably increased in this way.

According to one embodiment, the electromagnetic actuator is formed with a magnetizable, in particular ferromagnetic, core that is immovable relative to the coil. A non-magnetic gap space is arranged between the core and the solenoid armature. In particular, the non-magnetic gap space forms a free space in the first and/or second actuating direction between the core and the solenoid armature, so that in operation the core is always free of contact relative to the solenoid armature. In an exemplary embodiment, a non-stick body, such as a non-stick coating or a non-stick disk, made of a non-magnetizable material, for example PTFE (Teflon®), can be arranged in the gap space. The non-stick body arranged in the gap space can cover the surface of the core and/or the solenoid armature in the gap space in sections or over the entire surface. The electromagnetic actuator is to be measured in particular in such a way that in the first closed position and/or in the second closed position the non-magnetic gap, which may be at least partially filled with an anti-adhesive body, remains between the core and the armature of the electromagnet.

According to one embodiment of an electropneumatic solenoid valve, the driver has a stop for determining an end position of the solenoid armature relative to the driver against the driving direction. The position of the stop in the driving direction may be adjustable relative to the driver. In particular, the position of the stop in the driving direction is stationary relative to the driver. The stop may be rigidly connected to the driver, for example positively or integrally. The stop limits the mobility of the solenoid armature relative to the driver against the driving direction. In the driving direction, the solenoid armature can move relative to the driver unhindered by the stop. When the solenoid armature is moved against the driving direction by the electromagnetic actuator and/or the restoring pretensioning means, the solenoid armature comes into contact with the stop. By forcing the solenoid armature against the stop of the driver, it is ensured that the solenoid armature and the driver perform a joint movement against the driving direction. In this way, the solenoid armature can drive the driver to bring the valve member into the first closed position.

According to one embodiment of an electropneumatic solenoid valve, the driver pretensioning means limits a stop action, such as a stop force, of the valve member on a valve seat in the driving direction. The driver pretensioning means can limit the stop force of the valve member on a valve seat, for example in the driving direction, which can correspond to the second actuating direction, on the second valve seat. The driver pretensioning means may limit the stop force of the valve member on the valve seat in the closed position, which is caused by an electromagnetic actuation of the solenoid armature by the electromagnetic actuator. For example, the second closed position may be achieved by actuation of the solenoid armature by the electromagnetic actuator. The closed position may be achieved by moving the solenoid armature through the electromagnetic actuator, the movement being transmitted from the solenoid armature to the driver via the driver pretensioning means. As long as the valve member moves freely between the first valve seat and the second valve seat, the movement of the driver here corresponds to the movement of the solenoid armature. If the valve member comes into contact with a valve seat in the driving direction, this impedes further movement of the driver in the driving direction, whereby further movement of the solenoid armature in the driving direction, for example into the gap space, can occur. The movement of the solenoid armature in the driving direction beyond the closed position can be at least partially or completely absorbed by the driver pretensioning means without the solenoid armature movement being transmitted to the valve member. In this way, the stop effect, in particular the stop force, of the valve member on the valve seat in the driving direction is limited. In this way, on the one hand, the impulse force of the valve member striking the valve seat in the driving direction is considerably reduced, because the mass of the solenoid armature, which is considerably higher relative to the mass of the driver and valve member, is decoupled, so that it is not the mass of the solenoid armature that has an effect on the impulse force of the valve member striking the valve seat in the driving direction. Furthermore, it is avoided that the movement of the solenoid armature into the gap space results in a corresponding movement or deformation of the valve member; unlike in the prior art according to FIG. 9, where there is a material-locking, rigid connection of the solenoid armature to the valve member. Furthermore, the stop effect of the valve member in the driving direction on the valve seat is decoupled from the exponentially increasing magnetic force that the electromagnet exerts on the solenoid armature as the gap space becomes smaller. It is not the effective magnetic force that is transmitted from the solenoid armature to the driver, but only the additional spring force of the driver pretensioning means caused by this (free) travel in the area of the gap space.

Alternatively or additionally, the restoring pretensioning means can limit a stop action, in particular the stop force, of the valve member on a valve seat against the driving direction. For example, the electropneumatic solenoid valve may be designed such that when the electropneumatic actuator is de-energized, the force of the restoring pretensioning means alone urges the valve member into a closed position, for example the first closed position, against a valve seat, for example the first valve seat. In such an embodiment, the restoring pretensioning means may be designed by a spring having a linear characteristic or a progressive characteristic. In the closed position effected by the restoring pretensioning means, for example the first closed position, a predetermined closing force corresponding to a pretensioning of the restoring pretensioning means is provided. The pretensioning force of the restoring pretensioning means may be selected according to a pretensioning spring travel that is substantially smaller than the travel of the valve member from the first closed position to the second closed position. For example, the preload spring travel may be less than 50%, less than 20%, or even less than 10% of the actuator travel. The preload force provided by the return preload means in this closed position corresponds to the stop force of the valve member on the valve seat.

According to one embodiment, an electropneumatic solenoid valve may further comprise a second air chamber and a second valve member disposed therein. The second valve member may be carried by the driver, as may the first valve member. The second valve member may be carried by another driver. The driver, in particular an actuating rod, can be fork-shaped and comprise a plurality of tines, on each of which at least one valve member can be supported. The second valve member is in particular an at least partially elastic sealing element. Three further air channels open into the further air chamber. The further air channels comprise a fourth air channel, a fifth air channel and a further control air channel. In the first closed position, the second valve member closes the fourth air channel and releases the fifth air channel. In the second closed position, the second valve member closes the fifth air channel and releases the fourth air channel.

For example, the fifth air channel may be a supply air channel connected to a pneumatic source, such as a compressed air reservoir, a compressor, or the like. The fourth air channel may be an exhaust air channel connected to a pressure sink, such as the atmosphere. The further control air channel may be connected to a pneumatic actuator to ventilate and/or vent it. In particular, the electropneumatic solenoid valve is designed as a 5/2-way valve. If the electropneumatic solenoid valve is designed as a 5/2-way valve, the first valve member may be accommodated in the air chamber in such a way that the valve member closes either the first air channel or the second air channel, and the second valve member may be accommodated in the further air chamber in such a way that the second valve member closes either the fourth air channel or the fifth air channel.

The driver or the additional driver connects the second valve member in a force-transmitting manner to the solenoid armature, which is in particular exactly one. At least one driver pretensioning means, such as a spring, is arranged between the driver for the second valve member and the solenoid armature for providing a pretensioning force on the driver in a driving direction corresponding to the first actuating direction or corresponding to the second actuating direction. Furthermore, at least one restoring pretensioning means, such as a restoring spring, is provided for providing a return force to the driver for the second valve member against the driving direction. The restoring pretensioning means can be arranged in particular between the driver for the second valve member and the electromagnetic actuator, preferably a core of the electromagnetic actuator that is immovable relative to the coil.

The electropneumatic solenoid valve can comprise n (more than two) valve members in n air chambers with respective air channels, wherein the n further valve members can be carried on the same driver or several drivers, in particular individual drivers. The n further valve members may be implemented in an electropneumatic solenoid valve corresponding to a second valve member described above. In particular, the electropneumatic solenoid valve can be implemented as an n/2-way valve.

According to a further development of an electropneumatic solenoid valve, the first air channel and the fifth air channel are pneumatically connected in parallel. Alternatively or additionally, the second air channel and the fourth air channel can be connected in parallel. For example, the first air channel and the fifth air channel may be implemented as ventilation channels that are connected to a pneumatic source via a common supply channel. For example, the second air channel and the fourth air channel may be implemented as venting channels connected to a pneumatic sink, in particular the atmosphere. According to an alternative further development of an electropneumatic solenoid valve, the first air channel and the fourth air channel are pneumatically connected in parallel. Alternatively or additionally, the second air channel and the fifth air channel may be connected in parallel. For example, the second air channel and the fifth air channel can be implemented as venting channels that are connected to a pneumatic sink, in particular the atmosphere.

According to a further embodiment of an electropneumatic solenoid valve, the driver comprises an elastic coupling between the first valve member and the second valve member. According to this embodiment, the first and second valve members are carried on the same driver. An elastic coupling may form a portion of the driver that has increased elasticity relative to the rest of the driver. For example, the elastic coupling may have at least 10%, at least 50%, or at least 100% higher elasticity than a portion of the driver between the elastic coupling and/or the first valve member and the driver pretensioning means. In particular, the elastic coupling can limit a stop action, in particular a closing force, of the further valve member on at least one further valve seat.

According to another further embodiment of an electropneumatic solenoid valve, the driver comprises a rigid coupling between the first valve member and the second valve member. According to this embodiment, the first and second valve members are carried on the same driver. In an exemplary embodiment, the entire driver is rigid. In particular, the elasticity of the driver is constant between the second valve member and the first valve member and/or the driver pretensioning means. In particular, the driver pretensioning means can limit a stop action of the further valve member on a further valve seat in the driving direction and/or the restoring pretensioning means can limit a stop action of the further valve member on a further valve seat against the driving direction.

According to one embodiment, the electropneumatic solenoid valve comprises analog and/or digital diagnostic electronics which, preferably during activation of the coil for actuating the solenoid armature, detect the current flowing through the coil to provide a diagnostic result. In particular, the diagnostic electronics may be configured to provide the diagnostic result based on at least a first local current flow minimum. For example, the diagnostic electronics can be configured to provide the diagnostic result taking into account a time difference between at least one (first) local current flow minimum and a reference time. The reference time can be predetermined. In particular, the diagnostic electronics can be configured to provide a diagnostic result based on at least two local current flow minima, a first local current flow minimum and a second local current flow minimum. The diagnostic electronics can be configured to provide a diagnostic result taking into account a second time difference that exists between the occurrence of the first current flow minimum and a reference time defined by the occurrence of the second local current flow minimum. Based on the time difference, it is possible to make a statement about the wear status of the 3/2-way valve. The diagnostic electronics can be designed to output a warning message or an error message if the time difference falls below a predetermined threshold.

The analog and/or digital diagnostic electronics of the electropneumatic solenoid valve can be set up in particular to perform a diagnostic procedure as described below. For analog diagnosis, the current value can be converted into electrical voltage via a shunt resistor and continuously monitored over time. Differential elements can be used to detect the kinks and convert them into individual pulses, for example. A counting element can convert the elapsed time between the two pulses into a digital or analog value. For digital analysis when using a microprocessor, a microcontroller or the like, this can continuously digitally convert the voltage signal at the shunt resistor and detect and evaluate the kinks and their time difference by a firmware routine. Additional damping elements can be used to increase the time difference between the stop kinks. This results in better detectability for the evaluation electronics. The damping elements can damp either the armature with respect to the housing or the valve rod with the sealing element with respect to the armature. The time characteristic of the current rise can also be optimized by an optimally selected amplitude of the switching voltage.

The disclosure also relates to a field device for a process plant, such as a power plant, a chemical plant, a food processing plant or the like, comprising an in particular single-acting or double-acting pneumatic control valve actuator and an electropneumatic solenoid valve as described above, wherein the first air channel is a venting channel for connection to a pneumatic source and the second air channel is a venting channel for connection to a pneumatic sink, and wherein the control air channel is connected to a control air chamber of the control valve actuator.

According to one embodiment of a field device, the pneumatic control valve actuator can be designed as a single-acting control valve actuator with spring return. In an exemplary embodiment, a single-acting control valve actuator includes exactly one pneumatically actuatable control air chamber for providing a control valve actuating force which acts against a restoring force of the spring return. According to this design, the solenoid valve can be implemented in particular as a 3/2-way valve.

According to one embodiment of a field device with a double-acting pneumatic control valve actuator and an electropneumatic solenoid valve with a first valve member and a second valve member, in particular as described above, the control air channel is connected to a first control air chamber of the control valve actuator and the second control air channel is connected to a second control air chamber acting in the opposite direction to the first control air chamber. According to this embodiment, the solenoid valve can be implemented in particular as a 5/2-way valve. In an exemplary embodiment, a double-acting pneumatic control valve actuator includes exactly two oppositely acting control air chambers for actuating a control valve. In such a field device, according to an exemplary embodiment, the first and fifth air channels are designed as ventilation channels and the second and fourth air channels are designed as venting channels. In this way, simple actuation of the double-acting pneumatic control valve actuator can be ensured by the first valve member ventilation while the second valve member venting or vice versa.

The disclosure also relates to a diagnostic method for an electropneumatic solenoid valve of a field device of a process plant, such as a power plant, a chemical plant, a food processing plant or the like. In particular, the diagnostic method for an electropneumatic solenoid valve and/or or field device may be designed according to as described above.

The diagnostic method includes a diagnostic routine. According to the diagnostic routine, an electromagnetic actuator with a solenoid armature is activated to actuate a valve member. According to the diagnostic routine, the impact of a valve member on a valve seat is detected as a first reference time and the impact of the solenoid armature on a stopper, such as a non-magnetic non-stick body, for example a non-stick coating or a non-stick disk, in particular on a stationary core of the electromagnetic actuator, is detected as a second reference time. According to the diagnostic routine of the diagnostic method, a stop time difference between the first reference time and the second reference time is determined. The stop time reference is to be compared to a predetermined time difference reference value. It is conceivable that the stop time differences of several successively executed diagnostic routines are compared with each other. It is also conceivable that a combination of the aforementioned comparisons is made, for example, several different recorded time differences of different diagnostic routines can be compared with each other. Based on the comparison of one or more stop time difference values recorded in one or more diagnostic routines of the diagnostic method, a statement can be made about the state of wear of the electropneumatic solenoid valve. The diagnostic method according to the disclosure therefore allows continuous monitoring of the operating state of the 3/2-way valve during ongoing operation, so that the solenoid valve can be used over its entire safe service life. Furthermore, monitoring the functionality and wear condition of the electromagnetic solenoid valve allows particularly safe operation, because unexpected failure as a result of wear can be reliably ruled out.

It should be made clear that the naming of the reference times as "first" or "second" reference time, as well as "third", "fourth" or further reference time, if applicable, is not related to a temporal occurrence of the reference times. Rather, the different naming makes it clear that different reference times correlate to different diagnosis-relevant events and that a specific individual reference time can be assigned to the specific diagnosis-relevant events.

In one embodiment of a diagnostic method, the impact of a further valve member on a further valve seat is detected as a fourth reference time in the diagnostic routine. In particular, at least one further impact time difference between the fourth reference time and the first reference time and/or the second reference time is determined. According to one embodiment of the diagnostic method, current may flow through a coil of the actuator to activate the electromagnetic actuator, and the first reference time and/or the second reference time and/or the fourth reference time may be detected based on a local (first, second and/or third) local minimum of the current flow through the coil. The current flow through the coil of the electromagnetic actuator is related to the movement and position of the solenoid armature relative to the electromagnetic actuator. When the solenoid armature experiences deceleration, for example when the valve member strikes a valve seat and/or when the solenoid armature ceases to move freely, a temporally localized current flow minimum of the current flowing through the coil occurs correlating to the deceleration. For example, the diagnostic procedure can be performed taking into account a time difference between at least one (first) local current flow minimum and a reference time. The reference time point may be predetermined. In particular, a diagnostic method may be performed based on at least two local current flow minima, a first local current flow minimum and a second local current flow minimum. The diagnostic method may be performed taking into account a second time difference existing between the occurrence of the first current flow minimum and a reference time defined by the occurrence of the second local current flow minimum. According to an embodiment of the diagnostic method that is combinable with the previous one, the release of the valve member from a second valve seat may be detected as a third reference time for the diagnostic method. A movement time difference between the first reference time and the third reference time may be detected, based on which a further diagnostic function may be performed. For example, a comparison of the detected movement time difference compared to a movement time difference reference and/or movement time difference values of one or more different other diagnostic routines can be used to determine whether the valve member can move unimpeded from the first valve seat and the second valve seat. In particular, the release of the further valve member from another further valve seat can be detected as a fifth reference time.

According to one embodiment of a diagnostic method that can be combined with the previous one, a plurality of diagnostic routines are performed in succession, wherein the stop time differences of the plurality of diagnostic routines are taken into account, in particular compared with each other.

According to one embodiment of a diagnostic method, a wear condition warning is generated as a diagnostic result when the stop time difference of at least one diagnostic routine approaches or equals zero. For example, a wear condition warning may be generated when, contrary to expectations, no two local current flow minima occur during execution of the diagnostic procedure, but only one, because this indicates that the electropneumatic solenoid valve is not functioning properly. For example, the valve member and/or the valve seat may be defective such that safe closing of the valve member is no longer guaranteed. It is also conceivable that a foreign object has gotten between the solenoid armature and the electromagnetic actuator or between the valve seat and the valve member, so that proper movement is no longer possible. However, a wear condition warning can already be issued if, for example, the evaluation of the stop time differences of several successive diagnostic routines reveals a trend and/or run according to which the stop time difference experiences a critical change, i.e. decreases, for example, i.e. approaches zero.

According to one embodiment of a diagnostic method that can be combined with the previous one, a malfunction warning can be issued as a diagnostic result if a second time difference between two reference times during at least one diagnostic routine exceeds a limit value. In this case, a second or further time difference between the first reference time and the third reference time or between the second reference time and the third reference time can be detected and compared with an assigned limit value. It is also conceivable that the first reference time, the second reference time and/or the third reference time is compared with another, for example predetermined, fourth reference time and the time difference is compared with an assigned limit value.

An electropneumatic solenoid valve according to the disclosure, which is designed as a 3/2-way valve, is generally attributed with the reference sign 1. As essential components, the solenoid valve 1 comprises an electropneumatic actuator 3, which is designed as a linear actuator, and an air chamber 5 with exactly three air channels opening therein, namely a first air channel 11, which is designed as a ventilation channel and is connected to a pneumatic source, a second air channel 21, which is designed as a venting channel and is connected to the atmosphere, and a third air channel, which is designed as a control air channel 51 and is connected to a pneumatic actuator (not shown in detail).

With the electropneumatic solenoid valve 1, the control air channel 51 always remains open inside the air chamber 5, regardless of the position of the valve member 53. The solenoid valve 1 has a first closed position (FIG. 1) in which the ventilation channel 11 is closed by the valve member 53. The solenoid valve 1 has a second closed position (FIGS. 2a and 2b) in which the valve member 53 closes the vent channel 21. The solenoid valve is brought into the first closed position (FIG. 1) by a movement of the valve member 53 in the first actuating direction S1. The solenoid valve 1 is brought into the second closed position (FIG. 2a, FIG. 2b) by a movement of the valve member 53 in the second actuating direction S2. A movement of the valve member 53 in the direction of the first valve seat 13, which surrounds the mouth of the first air channel 11, is in the exemplary embodiment shown a movement of the valve member 53 in a first actuating direction S1. A movement of the valve member 53 in the direction of a second valve seat 23, which surrounds the mouth of the second ventilation channel 21 into the air chamber 5, realizes an actuating movement in a second actuating direction S2 in the exemplary embodiment shown in FIG. 1.

The valve member 53 is rigidly coupled to a driver which, in the exemplary embodiment shown in the figures, is implemented as an actuating rod 7. The actuating rod 7 is mounted movably relative to the housing of the solenoid valve 1 for linear movement in the first actuating direction S1 and/or in the second actuating direction S2. The actuating rod 7 is connected to a solenoid armature 33 of the electromagnetic actuator 3 by means of a force-transmitting pretensioning means implemented by a coil spring 71.

The electromagnetic actuator comprises a coil 31 through which a control current I can flow in order to build up an electromagnetic field under the influence of which the solenoid armature 33 can be actuated. In the exemplary embodiment of an electromagnetic actuator 3 as a linear actuator shown in FIG. 1, FIG. 2a and FIG. 2b, the solenoid armature 33 is arranged coaxially within the magnet coil 31. The rotational symmetry axis of the coil may correspond to the rotational symmetry axis of the actuator rod 7 and/or the valve member 53, as illustrated. The actuating rod 7 is linearly movable and with it the valve member 53.

To actuate the electropneumatic actuator 1, an electric current I flows through the coil 31 of the solenoid actuator 3. The electromagnetic field generated by the activation of the solenoid coil 31 causes a magnetic attraction force, possibly reinforced by a magnetic core 35, on the linearly movable solenoid armature 33. The magnetic attraction force of the magnet actuator 3 on the solenoid armature 33 causes a movement of the solenoid armature 33 in the driving direction M. The movement of the solenoid armature 33 is transmitted via the driver pretensioning means 71 to the driver 7, i.e. the actuating rod that carries the valve member 53. In the illustrated version, the driving direction M corresponds to the second actuating direction S2. In the illustrated embodiment, when the solenoid coil 31 is activated to actuate the solenoid armature 33, this can result in a movement of the solenoid armature 33 in the driving direction M (upwards in the illustrated embodiment) and a corresponding, rectified movement of the valve member 53 in the second actuating direction S2. When the electromagnetic actuator 3 is activated, the solenoid armature 33, the driver 7 and the valve member 53 can move from the first closed position along a valve travel x in the second actuating direction (upwards) until the valve member 53 reaches the second closed position (FIG. 2a). The valve member 53 reaches the second closed position when it engages the second valve seat 23, which forms the mouth of the second air channel 21 into the air chamber 5.

Thanks to the decoupling of the driver 7 from the solenoid armature 33 by the interposed and braced driver pretensioning means 71, the solenoid armature 33 can continue to move in its driving direction M. After the valve member 53 has come into engagement in the driving direction M with the valve seat 23 by the joint movement of the solenoid armature 33, the valve member 53 and the driver 7, and cannot perform any movement, the solenoid armature 33 can move further along a free travel s. The movement of the solenoid armature 33 along the free travel distance s can be hindered by a spring, a damping or the like, or can be unhindered.

The solenoid armature 33 can continue to move in the driving direction M until the movement of the solenoid armature 33 relative to the solenoid coil 31 is stopped (FIG. 2b). In the illustrated embodiment, the solenoid armature 33 abuts against a non-magnetic stopper 74 in the gap 34 between the solenoid armature 33 and the magnet core 35. The non-magnetic stopper 74 prevents contact between the ferromagnetic components of the solenoid armature 33 and the magnet core 35.

During the movement of the solenoid armature 33 along the free travel distance s, the valve member 53 and the driver 7 are in a stationary position relative to the housing of the solenoid valve 1. Since the solenoid armature 33 is supported on the driver 7 via the driver pretensioning means 71, the driver pretensioning means 71 is compressed in accordance with the free travel distance s, which the solenoid armature 33 completes. The stroke or free travel s corresponds to a spring travel of the driver pretensioning means 71. The movement of the driver 33 along the free travel 33 exerts a closing force on the valve member 53, which corresponds to the free travel s multiplied by the spring constant of the driver pretensioning means 71. This closing force can be many times less than the magnetic force acting on the solenoid armature 33 when very close to the magnetic core 35.

In the driving direction M, the driver pretensioning means 71 presses against the driver 7 with the pretensioning force V. Opposite to the driving direction M, in the illustrated version according to FIGS. 1, 2a and 2b, the restoring pretensioning means 73 acts on the driver 7 with the restoring force R from the stationary magnet core 35.

In the embodiments of the electropneumatic solenoid valve 1 shown in FIGS. 2a and 2b, when the electromagnetic actuator 3 is deactivated by terminating or interrupting the current flow through the coil 31, the magnetic attraction force on the solenoid armature 33 in the driving direction M disappears. The pretensioning forces of the return coil spring 73 directed against the driving direction M and the pretensioning force of the driver pretensioning means 71 acting in the position according to FIG. 2b then cause the solenoid armature 33 to move against the driving direction M (downward).

The driver pretensioning means 71 clamped between the driver 7 and the solenoid armature 33 moves the solenoid armature 33 counter to the driving direction M up to a stop 75 formed on the driver 7. The stop 75 limits the linear mobility of the solenoid armature 33 relative to the driver 7 counter to the driving direction M. The driver pretensioning means 71 and the solenoid armature 33 can be matched to one another in such a way that it is ensured by design that the driver pretensioning means 71 is always located at a position that is particularly suitable for the driving direction M. The driver 7, the stop 75, the driver pretensioning means 71 and the solenoid armature 33 can be matched to one another in such a way that it is ensured by design that the driver pretensioning means 71 is always in contact with both the driver 7 on the one hand and the solenoid armature 33 on the other hand, in particular with a tightened contact. When the solenoid armature 33 is in contact with the non-magnetizable stopper 74, the solenoid armature 33 is lifted by the free travel s from the stop 75 on the driver 7.

The restoring pretensioning means 73 is designed to (i.) move the solenoid armature 33 from the second closed position (FIG. 2a, FIG. 2b) against the driving direction M to the second closed position (FIG. 1) and/or (ii.) provide a closing force in the second closed position to press the valve member 53 against the first valve seat 13.

The restoring pretensioning means 73 is generally provided in a force-transmitting manner between the movable valve member 53 and a stationary part of the electropneumatic solenoid valve 1. The restoring pretensioning means 73 can, for example, be supported on the valve member 53, on the driver 7 or on the solenoid armature 33. On the other hand, the restoring pretensioning means 73 can be supported, for example, on a housing section of the solenoid valve 1, or on a stationary part of the electromagnetic actuator 3, for example the magnetic core 35. The restoring pretensioning means 73, in particular of the spiral spring type, can be arranged in a braced manner between the solenoid armature 33 and a stationary counter bearing of the electropneumatic solenoid valve 1. In the exemplary embodiments shown in the figures, the restoring pretensioning means 73 is supported on the one hand by the driver 7 and on the other hand by the solenoid core 35. When the restoring pretensioning means 73 moves the driver 7 in the first actuating direction S1, in the present embodiment the solenoid armature 33 is moved by the driver 7 by means of the drive biasing means 71.

In the first closed position (FIG. 1), the restoring pretensioning means 73 provides a pretensioning force on the driver 7 and the valve member 53 connected thereto, which causes a sealing contact of the valve member 53 with the valve seat 13 at the mouth of the first air channel 11 into the air 5. The spring travel of the restoring pretensioning means 73 corresponds to the travel distance x of the valve member 53 between the first valve seat 13 and the second valve seat 23.

The electropneumatic solenoid valve 1 shown in FIGS. 1, 2a and 2b is designed to open in a currentless state, so that in the event of a failure of the current flow I through the coil 31, the restoring pretensioning means 73 moves the valve member 53 into the first closed position S1 opening the ventilation channel 21. It is conceivable within the scope of the disclosure that a pneumatic solenoid valve according to the disclosure is designed as a currentless closing solenoid valve, for example in such a way that in the currentless state the restoring pretensioning means closes the venting channel; which can be realized, for example, by the second air channel 21 being a ventilation channel connected to a pneumatic source and the first air channel 11 being a venting channel connected to a pneumatic sink.

FIG. 3a shows a travel-time diagram of the in position of the solenoid armature 33, where the reference point (distance 0) is the end stop position of the solenoid armature 33 as shown in FIG. 2b and the distance of the solenoid armature away from the stop point is shown. FIG. 3b shows a travel-time diagram of the valve member 53, where the 0-point is the second closed position as shown in FIGS. 2a and 2b, from which the distance of the valve member 53 relative to the second valve seat 23 in the first actuating direction S1 is shown. FIG. 3c shows a current flow-time diagram, wherein the current flow through the coil 31 is shown. The figures shown in the diagrams are to be understood as qualitative comparison values.

FIGS. 3a, 3b and 3c refer to a fully functional electropneumatic solenoid valve according to the disclosure. FIGS. 4a, 4b and 4c refer to a defective electropneumatic solenoid valve according to the disclosure.

FIG. 3c shows the current flow I through the electromagnetic coil 31 when the electropneumatic solenoid valve 1 is actuated, starting from the first closed position (FIG. 1) or rest position, in which the valve member 53 is positioned by the force of the restoring pretensioning means 73.

From time t0 (0.1 second), the current flow I through coil 31 increases. As can be seen in FIGS. 3a and 3b, no movement of the valve member occurs at time t0 until time t3. As can be seen in FIG. 3b, the movement of the valve member starts at time t3. Between time t0 and time t3, the current flow I increases. As a result, the electromagnetic coil 31 causes an increasingly greater magnetic force to act on the solenoid armature 33, which is in the closed position (FIG. 1). At time t3, the magnetic actuating force is sufficiently large to overcome the pretensioning force R of the return biasing spring 73, which acts on the driver 7 and the valve member 53 in the closed position (FIG. 1) to press it against the first valve seat 13. The solenoid actuator 3 causes a movement of the solenoid armature 33, driver 7 and valve member 53 in the second actuating direction S2 from t3.

Between the time t3, which corresponds to the release of the valve member 53 from the first valve seat 13, and the time t1, the valve member moves against the first actuating direction S1 towards the second valve seat 53. At time t1, the valve member 53 comes into contact with the second valve seat 23 of the second air channel 21, and the actuating movement of the valve member 53 ends. The travel distance x that occurs between time t3 and time t1 (FIG. 3b) corresponds to the travel distance x of the valve member between the first closed position at the first valve seat 13 (FIG. 1) and the second closed position of the valve member 53 at the second valve seat 23 (FIGS. 2a, 2b). After the time t1, the valve member 53 is stationary in contact with the second valve seat 23.

Thanks to the decoupling of the solenoid armature 33 from the driver 7, which is rigidly connected to the valve member 53, the solenoid armature can continue to move in the driving direction even after the valve member 53 reaches the second closed position (FIG. 2a) at time t1 until the solenoid armature 33 comes up against an end stop 74 at time t2. This movement of the solenoid armature 33 is counteracted by the drive return means 71. As can be seen in FIG. 3a in correlation to FIG. 3c, after reaching the closed position according to FIG. 2a, the solenoid armature 33 initially remains in contact with the driving stop 75. If necessary, the solenoid armature 33 can briefly overshoot at time t1, when the valve member 53 reaches the valve seat. The solenoid armature 33 does not slowly disengage from the stop 75 until after time t1, when the current flow I in the coil 31 provides a sufficiently high magnetic force to also overcome the restoring force V of the driver pretensioning means 71. Subsequently, the solenoid armature 33 leaves the stop 75 and moves up to the stopper 74 in the driving direction M. When the current value I is reached at which the armature 33 starts to move, the inductance of the system immediately increases as the air gap starts to decrease. The rate of current rise decreases and even changes direction as the magnet system now induces a reverse voltage. This leads to the maximum current in the curve being reached shortly after the start of the armature movement. After that, the current drops again until the armature strikes its mechanical stop. The kink in the curve marks the point of impact of the armature.

At time t2, the solenoid armature 33 reaches its final end stop at a stopper 74, which forms a non-magnetic and non-magnetizable barrier between the solenoid armature 33 and the magnet core 35. As long as a sufficiently high control current I flows, the solenoid armature 33 remains in this final position (FIG. 2b).

With constant process parameters (restoring force R of the restoring pretensioning means, restoring force V of the driver pretensioning means, free travel s, valve travel x, actuating energy (current U), etc.), it is to be expected that the current flow curve of a fully functional electropneumatic solenoid valve 1 is the same for each actuating cycle, depending on the time t. Smaller tolerances may occur. The reference times t0, t1, t2 and/or t3, which are characterized by instantaneous force equilibria, occur reproducibly at time intervals relative to each other that remain the same for each cycle (i.e., each diagnostic routine) if the process parameters remain constant.

For example, the time difference dt between the first reference time t1 and the second reference time t2, can be expected to remain the same for different actuation cycles in a functioning electropneumatic solenoid valve, taking into account minor tolerances if necessary. The inventors have found that, on the basis of a sufficiently long period of time dt between the reference times t1 and t2, it can be concluded that the gap 34 between the solenoid armature 33 and the solenoid core 35 is sufficiently large and that any stopper 74 provided therein is not worn or at least not excessively worn.

The first kink at t1 (0.15 s) characterizes the sealing element hitting the upper seat 13, the second kink at t2 (0.1875 s) the armature 33 hitting the anti-adhesive disc 74. The time difference dt between the two stops (37.5 ms) is characteristic of a new, not yet worn valve. If the stroke of the seat now changes due to wear (setting effect), the time difference dt between the two kinks also changes.

A time difference between reference time t1 and reference time t3 and/or between reference time t1 and reference time t0 can be used to determine whether the travel x of valve member 53 between the first valve seat 13 and the second valve seat 23 is free and the movement of valve member 53 and driver are unhindered. If the time difference between the reference time t1 and a reference time t0 and/or t3 is conspicuously small, for example if the difference time falls below a minimum threshold value, it can be concluded that one of the springs has broken. If the time period between the reference time t1 and one of the reference times t0 and/or t3 becomes conspicuously long, for example above a maximum threshold value, it can be concluded that an obstacle is interfering with the movement of the driver and/or the valve member 53 or that an undesirably high frictional force is acting on the driver 7.

FIGS. 4a, 4b and 4c show the diagrams of a defective electropneumatic solenoid valve. The time difference dt* between the reference time t1 and t2 has decreased noticeably. The time difference dt* is smaller than a threshold value. This threshold value can be a predetermined threshold value. The threshold value can be determined when performing the diagnostic procedure by comparison to a reference time difference dt of one or more previous diagnostic routine cycles. The stroke x of the valve member 53 has increased due to wear, but the armature stroke s has remained the same. The time difference dt* between the stop of the sealing element 53 and the armature stop has critically shortened dt (37.5 ms) to dt* (19.1 ms). If more conspicuous values are measured, as shown in FIGS. 4a, 4b and 4c, the electropneumatic solenoid valve must be replaced.

FIG. 5 shows another solenoid valve 1a according to the disclosure. FIGS. 6a to 6d show another solenoid valve 1b according to the disclosure. FIG. 8 shows another alternative embodiment of a solenoid valve 1c according to the disclosure in a first, lower closed position.

The electromagnetic actuator 3 and the connection of the driver, designed as an actuating rod 7, to the actuator 3 by means of a driver pretensioning means 71 and a restoring pretensioning means 73 correspond to those described above, which is why reference is made to the previous explanations in this respect.

The solenoid valves 1a and 1b realize 5/2 directional control valves The first valve stage comprising the first valve member 53 in a first air chamber 5 with a first air channel 11, a second air channel 21 and a control air channel 51 is designed in the solenoid valves 1a and 1b as described above with respect to the solenoid valve 1. The second valve stage is designed in accordance with the first valve stage. That is, the second air chamber 105 corresponds to the first air chamber 5; the fourth air channel 111 is formed corresponding to the first air channel 11 and the fifth air channel 121 is formed corresponding to the second air channel 21; and each air chamber 5 or 105 has a control air channel 51 or 151, respectively. With regard to the structural design and functionality of the second valve stage, reference is otherwise made to the above description concerning the first valve stage in the solenoid valve 1 shown in FIGS. 1, 2a and 2b.

In the present embodiments, the first air channel 11 and the fifth air channel 121 are pneumatically connected in parallel and connected to a common feed channel 110. The feed channel 110 may be connected to a pneumatic source (not shown). In this case, the fifth air channel is a ventilation channel 121. The second air channel 21 and the fourth air channel 111 may be pneumatically connected in parallel to the atmosphere or another pressure sink. In this case, the fourth air channel is an exhaust air channel 111. The first control air channel 51 may be connected to a first control air chamber of a pneumatic double-acting actuator (not shown). The second control air channel 151 may be connected to a second control air chamber of a pneumatic double-acting actuator (not shown).

The solenoid valves 1a and 1b differ from the previously described solenoid valve 1 essentially only in the presence of a second valve stage comprising a further valve member 153 in a second air chamber 105 with associated further air channels 111, 121 and 151, two of which are selectively closable by the second valve member 153. The solenoid valves 1a and 1b differ from each other substantially only in their respective coupling 170 or 171 between the two valve members 53 and 153, which are carried by the same actuating rod 7. As a result of the two valve members 53 and 153 being attached to the same actuating rod 7, the first valve member 53 and the second valve member 153 move in the same first or second actuating direction S1 or S2.

The valve members 53 and 153 can move in the first actuating direction S1 until they are both in the first closed position (not shown). In the first closed position, the second valve member 53 is in sealing contact with a valve seat 13 of the first air channel 11 and the second valve member 153 is in sealing contact with a valve seat 113 of the fourth air channel 111.

The valve members 53 and 153 can move together in the second actuating direction S2 until they are both in the second closed position (FIG. 5, FIGS. 6a and 6b). In the second closed position, the first valve member 53 is in sealing contact with a valve seat 23 of the second air channel 21 and the second valve member 153 is in sealing contact with a valve seat 123 of the fifth air channel 121.

In the solenoid valve 1a shown in FIG. 5, the first valve member 53 and the second valve member 153 are connected to the same actuating rod 7. Between the valve members 53 and 153, the actuating rod 7 is designed as a rigid coupling 170. The rigid coupling 170 comprises a constant elasticity in the driving direction M, which corresponds to the elasticity of the actuating rod 7 between the first valve member 53 and the solenoid armature 33 and/or the driver pretensioning means 71. The actuating rod 7 is manufactured in one piece in the driving direction M starting at the driver pretensioning means 71 and the restoring pretensioning means 73 beyond the first valve member 53 up to the second valve member 153 as a solid rod with a constant cross section and constant material. When leaving a closed position, the two valve members 53 and 153 release the respective valve seats 13 and 113 or 23 and 123 simultaneously or almost simultaneously. When reaching a closed position, the two valve members in the unworn state occupy the valve seats 13 and 113 or 23 and 123 simultaneously (first and fourth reference points practically coincide).

In the solenoid valve 1b shown in FIGS. 6a to 6d, the first valve member 53 and the second valve member 153 are connected to the same actuating rod 7. Between the valve members 53 and 153, the actuating rod 7 is designed in sections with a flexible coupling 171. The elastic coupling 171 has an increased elasticity compared to the elasticity of the driver between the first valve member 53 and the armature 33 and/or the driver pretensioning means 71. An increased elasticity may be realized, for example, by a material recess, such as a radially outer constriction or opening transversely penetrating the actuating rod (not shown). Elastic coupling 171 may be realized by a section made of a different, more elastic material than that of the rest of the driver. For example, the elastic coupling 171 may be formed by a compression and/or tension spring section. For example, the solenoid valve 1b may be dimensioned such that the elastic coupling 171 is tensioned and elastically stretched in the second closed position (FIGS. 6a and 6b), and that the elastic coupling 171 is relaxed in the first closed position, or tensioned and elastically compressed in compression.

Starting from the second closed position (FIGS. 6a and 6b), the valve members 53 and 153 of the solenoid valve 1b can be moved in the first actuating direction S1, with first the first valve member 53 (FIG. 6c) and then the second valve member 153 (FIG. 6d) releasing the respective valve seat 23 or 123. During a further movement in the first actuating direction S1 up to the first closed position, first the second valve member 153 and then the first valve member 53 can come into sealing contact with the respective valve seat 13 or 113.

Starting from the first closed position, the valve members 53 and 153 of the solenoid valve 1b can be moved in the second actuating direction S2, whereby first the first valve member 53 and then the second valve member 153 releases the respective valve seat 13 or 113 (third reference time t3 according to FIG. 7). During a further movement in the second actuating direction S2 to the second closed position (FIGS. 6a and 6b), first (fourth reference time t4 according to FIG. 7) the second valve member 153 (FIG. 6c) and then (first reference time t1 according to FIG. 7) the first valve member 53 (FIG. 6b) can come into sealing contact with the respective valve seat 23 or 123. In the event of a further increase in force, the armature 33 can be raised relative to the stop 75 in the driving direction M as described above until the armature 33 hits the stopper 74 (FIG. 6a; second reference time t2 according to FIG. 7).

Based on the first stop time difference dt and a second stop time difference dt' between t4 and t1 or dt" between t4 and t2, the wear condition of the second valve stage can be detected.

In the solenoid valve 1c shown in FIG. 8, several valve members 53, 53', in particular of the same type, are connected to the same actuating rod 7'. The solenoid valve 1c shown in FIG. 8 works electrically and mechanically essentially like the solenoid valve 1a described above according to FIG. 5. When leaving a closed position, the two valve members 53 and 53' release the respective valve seats 13 and 13' or 23 and 23' simultaneously or almost simultaneously. When reaching a closed position, the two valve members 53 and 53' in the unworn state occupy the valve seats 13 and 13' or 23 and 23' simultaneously (first and fourth reference times practically coincide).

Solenoid valve 1c differs from solenoid valve 1a in that valve members 53 and 53' of solenoid valve 1c are not coaxially offset from each other in the axial direction of the actuator, as are valve members 53 and 153 of solenoid valve 1a. The actuating rod 7' forks between the common electromagnetic actuator 3 and the valve members 53 and 53'. The actuating rod 7' has two tines 173, 173' at its valve end. In FIG. 8, the left tine 173 carries the left valve member 53 and the right tine 173' carries the right valve member 53'. The valve members 53 and 53' are offset transversely with respect to the axis of symmetry of the electromagnetic actuator 3, in particular in parallel. At least one or more tines 173, 173' realize the stop 75 in the area of the forking of the actuating rod 7'. In the case of the solenoid valve 1c, it may be preferred that the two lower air channels 11 and 11' are air supply channel. The air channels 11 and 11' may be connected to the same or different pneumatic sources. The two upper air channels 21, 21' may be vent channels, which may open into a common atmospheric channel 120, as exemplified in FIG. 8. The left control air channel 51 and the right control air channel 51' may be connected to different or the same pneumatic control valve. For example, both control air channels 51 and 51 may be connected to the same pneumatic effective chamber (control air chamber) of a pneumatic actuator. Alternatively, the right control air channel 51 and the left control air channel 51' can be connected to a respective pneumatic effective chamber of different, in particular parallel connected and aligned, pneumatic actuators.

It should be understood that a solenoid valve 1c may comprise further tines with further valve members. Alternatively or additionally, the solenoid valve 1c according to FIG. 8 may comprise further valve stages along each individual actuating rod tine 173 and/or 173', as in the embodiments of solenoid valves 1a according to FIG. 5 or 1b according to FIGS. 6a to 6d.

The features disclosed in the foregoing description, figures, and claims may be significant, both individually and in any combination, for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

LIST OF REFERENCE NUMERALS 1 solenoid valve
3 electropneumatic actuator
5, 5', 105 air chamber
7, 7' adjusting rod
11, 11', 121 ventilation channel
13, 13' first valve seat 21, 21', 111 venting channel
23, 23' second valve seat
31 (solenoid) coil
33 solenoid armature
34 gap space
35 magnetic core
51, 51', 151 control air channel
53, 53', 153 valve member
71 driver pretensioner
73 restoring pretensioner
74 non-magnetic stopper
75 stop
110 supply channel
120 atmospheric channel
113, 123 valve seat
170 rigid coupling
171 elastic coupling
173, 173' tines
I control current
M driving direction
V driver pretensioning force
R restoring pretensioning force
S1 first actuating direction
S2 second actuating direction
dt, dt*, dt', dt" time difference
s free travel
t0, t1, t2, t3, t4 reference times
x valve travel

The invention claimed is:

1. An electropneumatic solenoid valve of a field device of a process plant, comprising:
an electromagnetic actuator having a coil that is configured to be energized and a solenoid armature configured to be movable relative to the coil;
at least one air chamber into which three air channels open, the three air channels comprising a first air channel, a second air channel, and a control air channel;
at least one valve member which, in a first closed position, is configured to close the first air channel and release the second air channel, and which, in a second closed position, is configured to close the second air channel and release the first air channel;
a driver configured to:
be movable in a first actuating direction and in a second actuating direction counter to the first actuating direction, and
connect the valve member to the solenoid armature in a force-transmitting manner;
a driver pretensioning spring, arranged between the driver and the solenoid armature, configured to provide a pretensioning force to the driver in a driving direction corresponding to the first actuating direction or second actuating direction;
a restoring pretensioning spring, arranged between the driver and a core of the electromagnetic actuator that is immovable relative to the coil, configured to provide a restoring force to the driver against the driving direction; and
diagnostic electronics configured to, during an activation of the coil for actuating the solenoid armature, detect a current flowing through the coil, based on a time difference between a first local current flow minimum corresponding to an impact of the valve member on a valve seat and a second local current flow minimum corresponding to an impact of the solenoid armature on a stopper, to provide a diagnostic result.

2. The electropneumatic solenoid valve according to claim 1, wherein the core of the electromagnetic actuator is magnetizable, a nonmagnetic gap being arranged between the core and the solenoid armature by a nonstick body made of a nonmagnetizable material arranged in the gap.

3. The electropneumatic solenoid valve according to claim 1, wherein the driver has a stop to determine an end position of the solenoid armature relative to the driver against the driving direction.

4. The electropneumatic solenoid valve according to claim 1, wherein:
the driver pretensioning spring is configured to limit a stop action of the valve member on a valve seat in the driving direction, and/or
the restoring pretensioning spring is configured to limit a stop action of the valve member on the valve seat against the driving direction.

5. The electropneumatic solenoid valve according to claim 1, wherein the solenoid valve further comprises:
a second air chamber into which three further air channels open, the further air channels comprising a fourth air channel, a fifth air channel, and a further control air channel; and
a second valve member which, in the first closed position, is configured to close the fourth air channel and release the fifth air channel and which, in the second closed position, is configured to close the fifth air channel and release the fourth air channel,
wherein the driver or a second driver carries the second valve member.

6. The electropneumatic solenoid valve according to claim 5, wherein the first air channel and the fifth air channel are pneumatically connected in parallel and/or that the second air channel and the fourth air channel are connected in parallel.

7. The electropneumatic solenoid valve according to claim 5, wherein the driver comprises an elastic coupling between the first valve member and the second valve member, the elastic coupling being configured to limit a stop action of the further valve member on at least one further valve seat.

8. The electropneumatic solenoid valve according to claim 5, wherein the driver comprises a rigid coupling between the first valve member and the second valve member, wherein: the drive pretensioning spring is configured to limit a stop action of the further valve member on a further valve seat in the drive direction, and/or the restoring pretensioning spring is configured to limit a stop action of the further valve member on a further valve seat against the drive direction.

9. A field device for a process plant, comprising:
a pneumatic control valve actuator having a control air chamber; and
an electropneumatic solenoid valve including:
an electromagnetic actuator having a coil that is configured to be energized and a solenoid armature configured to be movable relative to the coil;
at least one air chamber into which three air channels open, the three air channels comprising a first air channel, a second air channel, and a control air channel;
at least one valve member which, in a first closed position, is configured to close the first air channel and release the second air channel, and which, in a second closed position, is configured to close the second air channel and release the first air channel;

a driver configured to: be movable in a first actuating direction and in a second actuating direction counter to the first actuating direction, and connect the valve member to the solenoid armature in a force-transmitting manner;

a driver pretensioning spring, arranged between the driver and the solenoid armature, configured to provide a pretensioning force to the driver in a driving direction corresponding to the first actuating direction or second actuating direction;

a restoring pretensioning spring, arranged between the driver and a core of the electromagnetic actuator that is immovable relative to the coil, configured to provide a restoring force to the driver against the driving direction; and diagnostic electronics configured to, during an activation of the coil for actuating the solenoid armature, detect a current flowing through the coil, based on a time difference between a first local current flow minimum corresponding to an impact of the valve member on a valve seat and a second local current flow minimum corresponding to an impact of the solenoid armature on a stopper, to provide a diagnostic result, wherein the first air channel is a vent channel for connection to a pneumatic source and the second air channel is a vent channel for connection to a pneumatic sink, the control air channel being connected to the control air chamber of the pneumatic control valve actuator.

10. The field device according to claim 9, further comprising:

a double-acting pneumatic control valve drive, and an electropneumatic solenoid valve including:

a second air chamber into which three further air channels open, the further air channels comprising a fourth air channel, a fifth air channel, and a further control air channel; and a second valve member which, in the first closed position, is configured to close the fourth air channel and release the fifth air channel and which, in the second closed position, is configured to close the fifth air channel and release the fourth air channel, wherein the control air channel is connected to a first control air chamber of the control valve drive and that the second control air channel is connected to a second control air chamber acting counter to the first control air chamber.

11. A diagnostic method for an electropneumatic solenoid valve of a field device of a process plant, comprising:

activating an electromagnetic actuator having a solenoid armature to actuate a valve member;

detecting, as a first reference time, an impact of the valve member on a valve seat corresponding to a first current flow minimum;

detecting, as a second reference time, an impact of the solenoid armature on a stopper of the electromagnetic actuator corresponding to a second current flow minimum; and determining a stop time difference between the first reference time and the second reference time.

12. The diagnostic method according to claim 11, further comprising:

detecting an impact of a further valve member on a further valve seat as a fourth reference time; and determining a further impact time difference between the fourth reference time and the first reference time and/or the second reference time.

13. The diagnostic method according to claim 11, wherein current flows through a coil of the electromagnetic actuator to activate the electromagnetic actuator, the first reference time and/or the second reference time being detected based on the a local minimum of the current flow through the coil.

14. The diagnostic method according to claim 11, wherein release of the valve member from a second valve seat is detected as a third reference time, and release of the further valve member from another further valve seat is detected as a fifth reference time.

15. The diagnostic method according to claim 11, wherein the method is repeated one after the other and respective stop time differences of the repetitions are compared with one another.

16. The diagnostic method according to claim 11, further comprising generating a wear condition warning as a diagnostic result in response to the stop time difference approaches zero or is equal to zero.

17. The diagnostic method according to claim 11, further comprising generating a malfunction warning as a diagnostic result in response to a difference between two reference times exceeds a limit value.

18. The diagnostic method according to claim 11, further comprising:

comparing the stop time difference to a predetermined threshold value; and outputting a warning message or an error message in response to the stop time difference being less than the predetermined threshold value.

* * * * *